US011406988B2

(12) United States Patent
Valerio

(10) Patent No.: US 11,406,988 B2
(45) Date of Patent: Aug. 9, 2022

(54) METHOD AND SYSTEM FOR PRODUCING AGGREGATE

(71) Applicant: Thomas A Valerio, Atlanta, GA (US)

(72) Inventor: Thomas A Valerio, Atlanta, GA (US)

(73) Assignee: TAV HOLDINGS, INC., Atlanta, GA (US)

( * ) Notice: Subject to any disclaimer, the term of this patent is extended or adjusted under 35 U.S.C. 154(b) by 504 days.

(21) Appl. No.: 16/090,264

(22) PCT Filed: Mar. 29, 2017

(86) PCT No.: PCT/US2017/024861
§ 371 (c)(1),
(2) Date: Sep. 30, 2018

(87) PCT Pub. No.: WO2017/172997
PCT Pub. Date: Oct. 5, 2017

(65) Prior Publication Data
US 2019/0111441 A1    Apr. 18, 2019

Related U.S. Application Data

(60) Provisional application No. 62/314,968, filed on Mar. 29, 2016.

(51) Int. Cl.
*B03B 9/06* (2006.01)
*B03B 9/04* (2006.01)
*B03B 5/30* (2006.01)

(52) U.S. Cl.
CPC ............ *B03B 9/061* (2013.01); *B03B 5/30* (2013.01); *B03B 9/04* (2013.01); *B03B 2009/068* (2013.01)

(58) Field of Classification Search
CPC .. B03B 5/30; B03B 9/04; B03B 9/061; B03B 2009/068; Y02W 30/52
See application file for complete search history.

(56) References Cited

U.S. PATENT DOCUMENTS

| | | | | | |
|---|---|---|---|---|---|
| 4,698,289 | A | * | 10/1987 | Aldrich | ................ C01G 49/009 106/DIG. 1 |
| 6,024,226 | A | * | 2/2000 | Olivier | .................... B03B 9/061 209/172.5 |
| 2008/0257794 | A1 | * | 10/2008 | Valerio | ................... B03B 9/061 209/567 |
| 2011/0173878 | A1 | * | 7/2011 | Jeong | .................... C04B 18/027 44/620 |
| 2017/0182500 | A1 | * | 6/2017 | Tamir | .................. B29B 17/0412 |

* cited by examiner

*Primary Examiner* — Michael McCullough
*Assistant Examiner* — Kalyanavenkateshware Kumar
(74) *Attorney, Agent, or Firm* — Greenberg Traurig LLP; Nigamnarayan Acharya

(57) ABSTRACT

A method for preparing clean aggregate from a waste stream including sizing the incinerator combined ash to recover a first material; wet screening the first material with a first screen to recover the material of disparate sizes; and processing each of the groups.

12 Claims, 1 Drawing Sheet

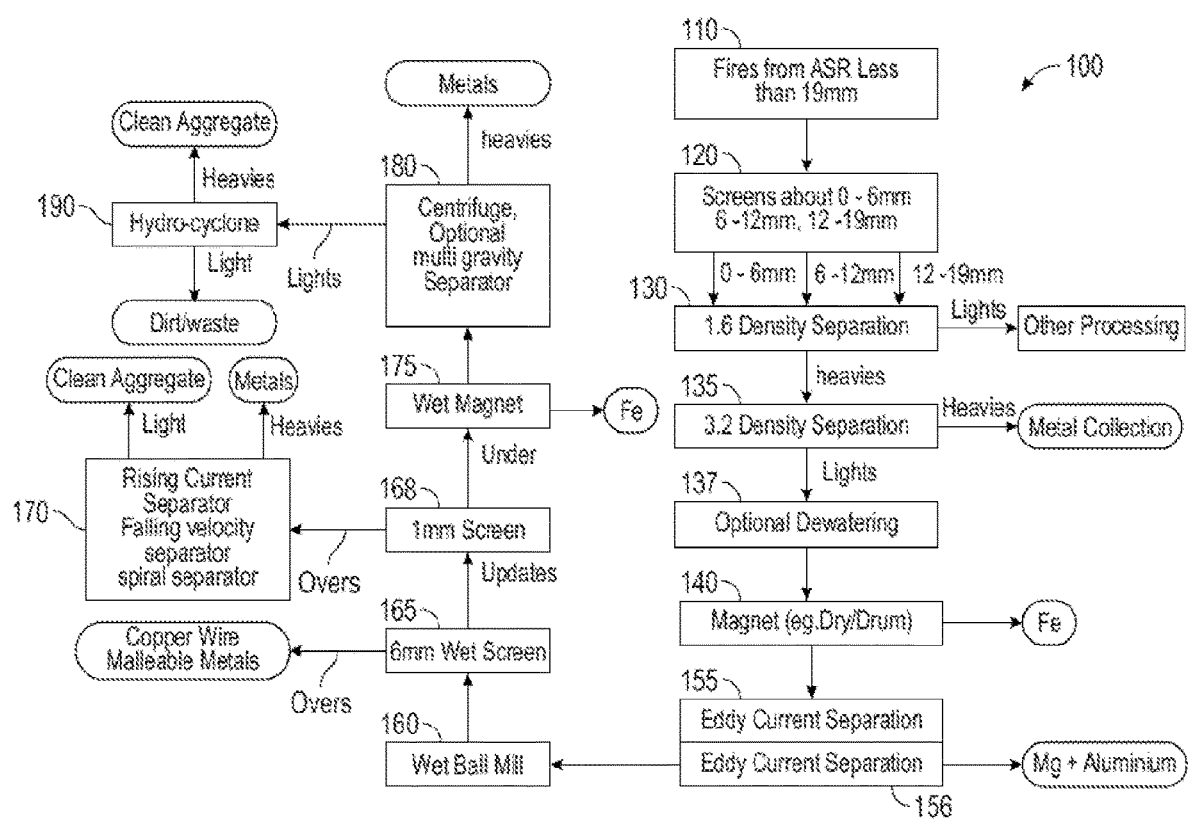

METHOD AND SYSTEM FOR PRODUCING AGGREGATE

CROSS-REFERENCE TO RELATED APPLICATIONS

This application claims priority to and the benefit of U.S. Patent Application No. 62/314,968, filed Mar. 29, 2016, which is incorporated herein by reference in its entirety

TECHNICAL FIELD

This disclosure relates to systems and methods for recovering aggregate from materials. More particularly, this disclosure relates to systems and methods for employing a method or system to separate materials in a recycling or waster recovery operation.

BACKGROUND

Recycling of waste materials is highly desirable from many viewpoints, not the least of which are financial and ecological. Properly sorted recyclable materials can often be sold for significant revenue. Many of the more valuable recyclable materials do not biodegrade within a short period, and so their recycling significantly reduces the strain on local landfills and, ultimately, the environment.

Typically, waste streams are composed of a variety of types of waste materials that can be used to produce aggregate and that have valuable metals. This aggregate can be of significant value, especially if it is relatively clean. One such waste stream is generated from the recovery and recycling of automobiles or other large machinery and appliances. For example, at the end of its useful life, an automobile is shredded. This shredded material is processed to recover ferrous and non-ferrous metals. The remaining materials, referred to as automobile shredder residue (ASR), which may still include ferrous and non-ferrous metals, including copper and other recyclable materials, is typically disposed of in a landfill. Efforts have been made to further recover materials, such as non-ferrous metals including copper from copper wiring and plastics. Similar efforts have been made to recover materials from whitegood shredder residue (WSR), which are the waste materials left over after recovering ferrous metals from shredded machinery or large appliances. Other waste streams that have recoverable materials may include electronic components (also known as "e-waste" or "electronic scrap" waste electrical and electronic equipment (WEEE)), building components, retrieved landfill material, or other industrial waste streams.

There is always a need for a cleaner, more efficient process and system for producing aggregate and for recovering metals and useful materials from a waste stream, including ASR. It is to this need, among others, that this application is directed.

SUMMARY

One aspect of this disclosure is a separation process for processing recycled materials (e.g. ASR). This exemplary method for preparing clean aggregate from a waste stream includes sizing the waste steam, to recover a first material less than about 19 mm; (wet) screening the first material with a first screen, using a water slurry, to recover groups of the ash of disparate sizes; separating the materials using a first density separator operating at about 1.6 to 2.0 SG and a second density separator operating at about 3.2 SG; magnetically separating to recover ferromagnetic metals and paramagnetic metals; using at least two eddy currents; using density separation to recover precious metals and heavy metal concentrate. Ultimately, one product is clean aggregate.

Another aspect of this disclosure is a system that executes the steps and processes disclosed herein.

BRIEF DESCRIPTION OF DRAWINGS

FIG. 1 depicts one embodiment of the separation process for processing recycled materials.

DETAIL DESCRIPTION

This application describes methods and systems for separating materials recovered from a waste stream, e.g., automobile shredder residue (ASR) or preferably the fines from ASR, which is the metal-rich mixture available after the metal recycling company has shredded waste and removed the majority of the metals from the shredded mixture. The method and systems may also be used on whitegood shredder residue, and electronic equipment residue.

ASR consists of a mixture of ferrous metal, non-ferrous metal (e.g. alloys of copper and aluminum) and shredder waste (e.g., glass, fiber, rubber, automobile liquids, plastics and dirt). ASR is sometimes differentiated into shredder light fractions and dust. Exemplary embodiments of the present invention provide systems and methods for producing a stream enriched in metal (e.g., copper, ferrous metals, and precious metals) and producing clean aggregate (e.g., relatively free of dirt), which has substantial commercial value.

FIG. 1 depicts one embodiment of the separation process 100 for processing waste stream (e.g. ASR) 110 This exemplary method for preparing clean aggregate from a waste stream includes sizing the incinerator combined ash to recover a first material less than about 19 mm 12; (wet) screening the first material with a first screen, using a water slurry, to recover groups of the ash of disparate sizes 120; processing each of the groups by (a) separating the first group using a first density separator operating at about 1.6 to 2.0 SG into a first heavy fraction and a first light fraction 130; (b) separating the first heavy fraction using a second density separator operating at about 3.2 SG into a second heavy fraction and a second light fraction 135, wherein the second heavy fraction contains metals; magnetically separating 140 the second light fraction to recover ferromagnetic metals and paramagnetic metals; separating magnesium and aluminum from the second light fraction using at least two eddy currents 155, 156; applying a size reducer to the second light fraction 160; wet screening the second light fraction with a second screen, using water slurry, to recover first unders and first overs 165; wet screening the first overs with a third screen, using a water slurry, to recover second unders and second overs 168; using density separation 180 to separate the second overs into a third light fraction further separated by a gravity separator 190 into a fourth light fraction and the fourth heavy fraction. The fourth light fraction can be clean aggregate. The third light fraction may be waste material having substantially no metals. The method can include separating the first unders into third overs, wherein the third overs are separated using a falling velocity separator 170 into a clean aggregate light fraction. The gravity separator can be a hydroclyclone 190. The method can include dewatering the second light fraction 137. The method can include reducing the size of the second light fraction using a size reducer 160. The ratio of centripetal force to the fluid may be low. The method of the materials of waste stream discretely sized. In one example, the metal content of the ASR was greater than 4% and the metal content of the aggregate is less than 0.1% and the aggregate was clean by commercial standards.

At step 110, recycled material waste streams, or residues, such as fines from ASR, WSR, and WEEE, are processed to separate and concentrate certain recoverable materials from the residues. Any combination of known or later-developed recycling processes can be used to separate and extract these materials. The results of these processes will be material streams that are concentrated in a particular type of material. One such process stream is concentrated in copper, precious metal and other metals. This stream will typically have copper material, non-ferrous metals, precious metals and ferrous metals. At the first stage, the materials are generally sized to less than 19 mm in length before being conveyed to the second stage. Material is continuously fed through the process and systems.

The next stage is a series of screens or wet screens. In one example, one or more screens may segregate the material into more discrete size ranges, such as from about 0 mm to 6 mm, 6 mm to 12 mm, 12 mm to 19 mm based on the mesh size of the screens. Material falling within these size ranges can be separately introduced into the next steps. By introducing material at discrete size ranges, the overall efficiency in the separation is improved. As used herein, the term "screen" or "screening" refers to any process or apparatus used to separate a feed stream into at least two grades (e.g. different size cuts) and includes both dry screening and wet screening. Conventional screening mechanisms include, but are not limited to, vibrating screens, gyratory screens, moving screens, static screens, horizontal screens or inclined screens.

The materials sized from the screens are conveyed to the next stage of the process, which is density separation using one or more jig concentrators or falling velocity separators to separate particles based on their specific gravity (relative density). The particles would usually be of a similar size, often crushed and screened prior to being fed over the jig bed. There are many variations in design; however the basic principles are constant: The particles are introduced to the jig bed (usually a screen) where they are thrust upward by a pulsing water column or body, resulting in the particles being suspended within the water. As the pulse dissipates, the water level returns to its lower starting position and the particles once again settle on the jig bed. As the particles are exposed to gravitational energy whilst in suspension within the water, those with a higher specific gravity (density) settle faster than those with a lower count, resulting in a concentration of material with higher density at the bottom, on the jig bed. The particles are concentrated according to density and can be extracted from the jig bed separately. In the separations of most heavy materials, the denser material would be the desired mineral and the rest would be discarded as floats (or tailings). The materials can be separated by about 1.6 Specific Gravity (SG) (e.g., about 1.4-2) in this embodiment.

The materials from the initial density separation greater than the specific density (e.g., about 1.6) can be conveyed to another process or density separation process. More particularly, the heavier materials or "heavies" from this process are conveyed to a second density separation process and the lighter material "lights" (e.g., plastics, wood, organics, textiles and other light materials) can be further processed using other techniques. The second density separation can be at about 3.2 sg (e.g., 3.0-3.4) in this embodiment. The "heavies" from the second density separation process can contain relatively pure metals, in some cases about 98% metal (e.g., copper, zinc, brass, stainless steel, and lead).

The lighter material from the second density separation step or jig is conveyed to a magnet (e.g., dry magnet/drum or wet magnet), which removes ferrous materials. Optionally, there can be a dewatering step before the material is conveyed to the wet magnet. The non-magnetic material, which includes dirt, stones, glass particles, and metals, is further processed using Eddy current separation or a cascade of Eddy current separation.

More specifically, the light materials from the second density separation can then travel to a series or cascade of Eddy current separators. An Eddy current separator typically includes a rotor featuring on cylinder surface rows of permanent magnet blocks of alternate polarities. The permanent magnet blocks can either be standard ferrite ceramic or the more powerful rare earth magnets. The rotor spins at high revolutions, typically between 1800 rpm and 4000 rpm, to produce a variable magnetic field generating "eddy currents" in the metals crossing it. In one embodiment, the Eddy current contains 40 pole changes and spins at about 4000 rpm. In another embodiment, the initial Eddy current contains 40 pole changes and spins at about 3500 rpm. When larger sizes (e.g., greater than 6 mm) of the material are processed on the Eddy currents, the eddy current may need to be run at lower speeds, e.g., 3500.

This Eddy current reaction on the different non-ferrous metals is different based on their specific mass, shape, and resistivity, creating a repelling force on the charged particles of the non-ferrous metals and causing the materials to be separated. The aluminum and magnesium can be collected at this stage or processed further.

The runoff or drops from the Eddy current (e.g. metallic and the non-metallic materials) are then conveyed to a wet mill. The mill reduces the size of the 2 mm to 0.3 mm material by comminuting the material to particles of reduced size and, thus, generally further separates iron from other materials. The wet mill may have a ball mill, vertical roller mill, roller press, high compression roller mill, for example. In the exemplary embodiment, the mill comprises a ball mill.

The material processed from the mill is then introduced to a first wet screen. In one example, the first wet screen is, e.g., about 6 mm. The "overs" from the first screen process or the material less than the screen size is collected, which includes insulated copper wires, malleable metals. As used herein, the term "wire" means a length or filament of metal with a high aspect ratio of length to diameter and may include a mix of ferrous, stainless steel and nonferrous wire. The material that passes through can be collected as an end-product.

The "unders" or the material that passes through the first wet screen is conveyed to a second screen, which has smaller mesh than the first screen. In one example, the second wet screen is about 1 mm. The overs are conveyed to a centrifugal concentrator (e.g. Falcon concentrator), a spiral, or other falling velocity separator. This step may be any type of centrifuge or process that exploits differences in specific gravity and liquid/solid properties to separate the diamagnetic fraction (or fraction passing through the second vibratory screen) into an elementary a heavy solid fraction and a light solid fraction (i.e. effluent). The centrifugal force applied by the centrifugal concentrator may be 60 to 150 G, for example. A water pump may provide fluidization water to the centrifugal concentrator. This fluidization water may be provided at a rate of about 20 to 40 gallons per minute, for example.

The materials from the falling velocity separator can be useful products. The heavy solid fraction from the centrifugal concentrator consists of free or liberated precious metal and copper. That is, the resulting product would have low concentrations of debris and other materials of non-value. The light material is clean aggregate. Each fraction can be sold and/or used in other processes.

Referring back to the "unders" or material that passed through the 1 mm screen, this material can be conveyed to a wet magnet, which removes ferrous materials. The remaining material can be processed through a centrifuge, spiral separator, or a (Mozley) multi-gravity separator. The solid fraction from the centrifugal concentrator or separator consists of free or liberated precious metal and copper. That is, the resulting product would have low concentrations of debris and other materials of non-value. This fraction can be sold and/or used in other processes.

The light solid fraction is directed to a centrifuge or hydrocyclone. After the slurry is pumped into the hydrocyclone, the heavy materials from the hydroclylone are clean aggregate and the lights (bottom) are waste or dirt.

An waste stream or ASR separation and recycling system has been illustrated and described which permits the separation of ASR/waste material into many constituent components for recycling or reuse. Among the products recovered are steel, stainless steel, copper, aluminum, other non-ferrous metals. One of ordinary skill in the art would appreciate that the present invention provides systems and methods for processing waste materials to recover valuable metals, such as copper, from the materials. The systems and methods employ processes that further refine the waste materials to concentrate the metallic material after the waste materials are initially processed.

Another embodiment includes a system for producing aggregate comprising a source of material that is a waste stream or auto shredder residue and less than about 19 mm; a screen that allows first material materials of about 2 millimeters (mm) or less to pass through a first screen and allows materials to pass through a second screen; a wet screen with water to recover groups of waste stream or ASR of disparate sizes; a first density separator operating at about 1.6 SG to separate groups of the first materials into a first heavy fraction and a first light fraction; a second density separator, operatively connected to the first density separator, operating at about 3.2 SG for separating the first heavy fraction using into a second heavy fraction and a second light fraction, wherein the second heavy fraction contains metals; a first magnet to separate to recover ferromagnetic metals and paramagnetic metals from the second light fraction; two or more eddy currents to remove magnesium and aluminum from the second light fraction; a second magnetic separator capable of recovering ferromagnetic metals or paramagnetic metals and operatively connected to the second density separator, a centrifuge separator at 3.2 SG operatively connected to the magnetic separator; a gravity separator, operatively connected to the second magnet. The size reducer can be selected from the group consisting of a ball mill, a crusher, and a shredder. The system can include de-waterer. The gravity separator is a hydroclycone. The parts and elements and operative connections are available to and known those with ordinary skill in the art.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

The invention claimed is:

1. A method for preparing clean aggregate from a waste stream, the method comprising:
   providing material from the waste stream;
   sizing the material to recover a first material less than 19 mm;
   wet screening the first material with a first screen, using water slurry, to recover groups of the auto shredder residue of disparate sizes;
   processing each of the groups by
   (a) separating a first group using a first density separator operating at 1.6 SG into a first heavy fraction and a first light fraction;
   (b) separating the first heavy fraction using a second density separator operating at 3.2 SG into a second heavy fraction and a second light fraction, wherein the second heavy fraction contains metals;
   (c) magnetically separating the second light fraction to recover ferromagnetic metals and paramagnetic metals;
   (d) separating magnesium and aluminum from the second light fraction using at least two eddy currents;
   (e) applying a size reducer to the second light fraction;
   (f) wet screening the second light fraction with a second screen, using water slurry, to recover first unders and first overs;
   (g) wet screening the first overs with a third screen, using water slurry, to recover second unders and second overs;
   (h) using density separation to separate the second overs into a third light fraction further separated by a gravity separator into a fourth light fraction and the fourth heavy fraction, and a third heavy fraction to recover precious metals and heavy metal concentrate, wherein the fourth light fraction is clean aggregate.

2. The method of claim 1, wherein the third light fraction is waste material having metal content of material is greater than 4%.

3. The method of claim 1, further comprising separating the first unders into third overs using a falling velocity separator into a clean aggregate light fraction.

4. The method of claim 1, wherein the gravity separator is a hydrocyclone.

5. The method of claim 1, further comprising dewatering the second light fraction.

6. The method of claim 1, wherein the material is discretely sized.

7. The method of claim 1, wherein the metal content of material is greater than 4% and has a dirt content of the aggregate is less than 0.1%.

8. The method of claim 1, further comprising a second magnetic separation.

9. A system for producing aggregate comprising:
   a source of material that is auto shredder residue and less than 19 mm;
   a screen that allows first material of 2 millimeters or less to pass through a first screen and allows materials 50 mm or less to pass through a second screen;

a wet screen with water to recover groups of auto shred residue of disparate sizes;

a first density separator operating at 1.6 SG to separate groups of the first materials into a first heavy fraction and a first light fraction;

a second density separator, operatively connected to the first density separator, operating at 3.2 SG for separating the first heavy fraction into a second heavy fraction and a second light fraction, wherein the second heavy fraction contains metals; a first magnet to separate ferromagnetic metals and paramagnetic metals from the second light fraction;

two or more eddy currents to remove magnesium and aluminum from the second light fraction;

a magnetic separator capable of recovering ferromagnetic metals or paramagnetic metals and operatively connected to the second density separator, a centrifuge separator at 3.2 SG operatively connected to the magnetic separator;

a gravity separator, operatively connected to the magnet separator.

10. The system as claimed in claim 9, further comprising a size reducer, wherein the size reducer is selected from the group consisting of a ball mill, a crusher, and shredder.

11. The system as claimed in claim 9, further comprising a de-waterer.

12. The system as claimed in claim 9, wherein the gravity separator is a hydrocyclone.

\* \* \* \* \*